United States Patent
Patent No.: 4378
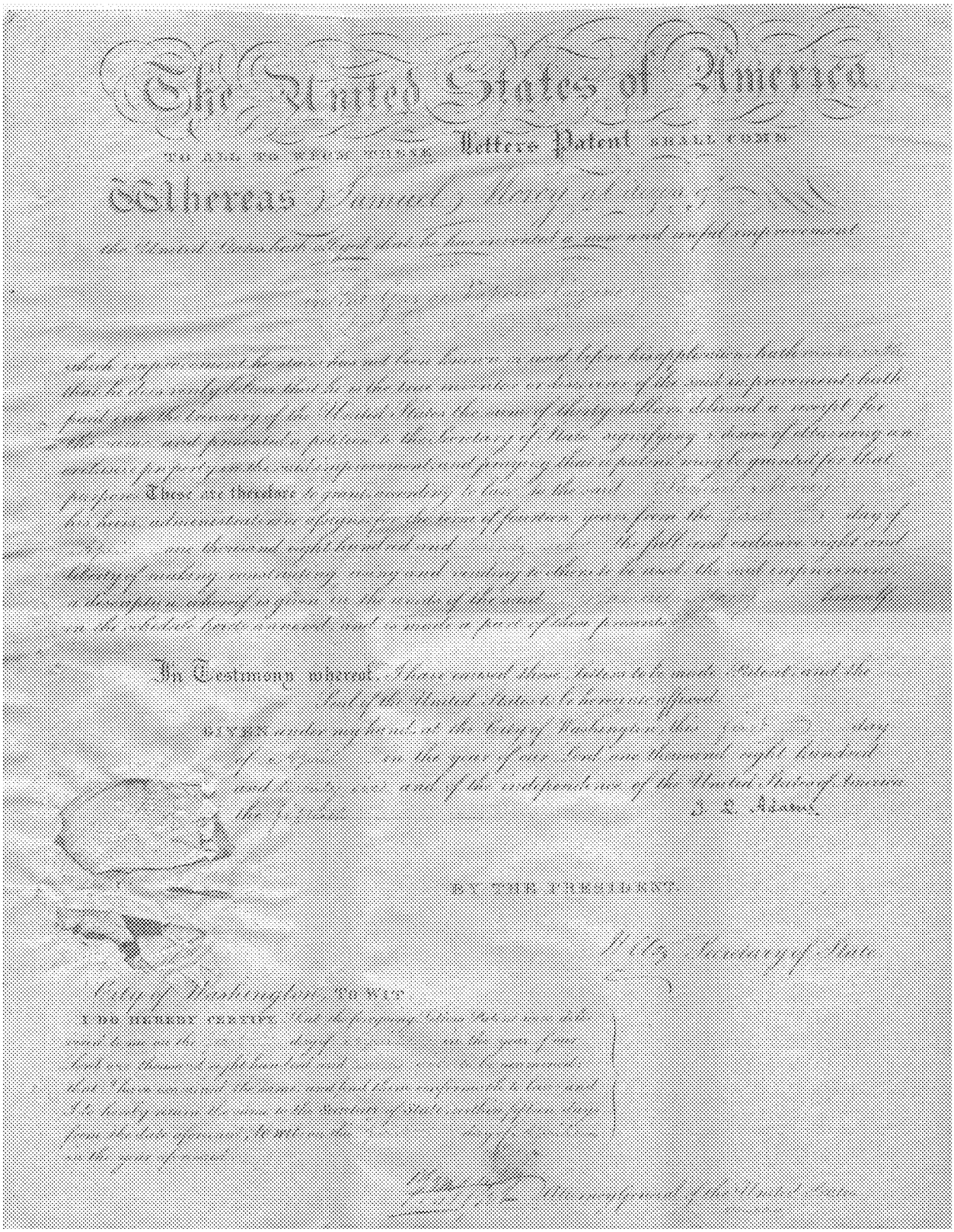
The United States of America
Letters Patent
Whereas
In Testimony whereof
By the President
Secretary of State
City of Washington

United States Patent

Patent No.: 4378

United States Patent

Patent No.: 4378

United States Patent

Patent No.: 4378

United States Patent

Patent No.: 4378

United States Patent

Patent No.: 4378

United States Patent

Patent No.: 4378

United States Patent

Patent No.: 4378

United States Patent

Patent No.: 4378

United States Patent

Patent No.: 4378